United States Patent [19]

Hock

[11] Patent Number: 4,941,348

[45] Date of Patent: Jul. 17, 1990

[54] ELECTROMOTIVE SENSOR

[75] Inventor: Darryl A. Hock, Harper Woods, Mich.

[73] Assignee: Jabil Circuit Company, Madison Heights, Mich.

[21] Appl. No.: 329,772

[22] Filed: Mar. 28, 1989

[51] Int. Cl.⁵ .......................................... G01M 19/00
[52] U.S. Cl. .................................. 73/119 A; 324/654
[58] Field of Search ............... 73/119 A; 324/415, 59, 324/523, 71.1, 77 R

[56]       References Cited
       U.S. PATENT DOCUMENTS 3,828,247  8/1974  Kirsch et al. ............... 73/119 AX
4,821,562  4/1989  Inoue ........................... 73/119 A Primary Examiner—Jerry W. Myracle
Attorney, Agent, or Firm—Harness, Dickey & Pierce

[57]               ABSTRACT

The circuit senses abrupt change in motion of an electromotively-driven part such as the onset of valve seating in a solenoid-operated valve. A constant current source supplies power to the solenoid coil and a pulse detector circuit monitors the voltage across the coil and determines the time rate of change of that voltage. A change in the algebraic sign of the time rate of change in voltage indicates that valve seating has occurred.

2 Claims, 5 Drawing Sheets

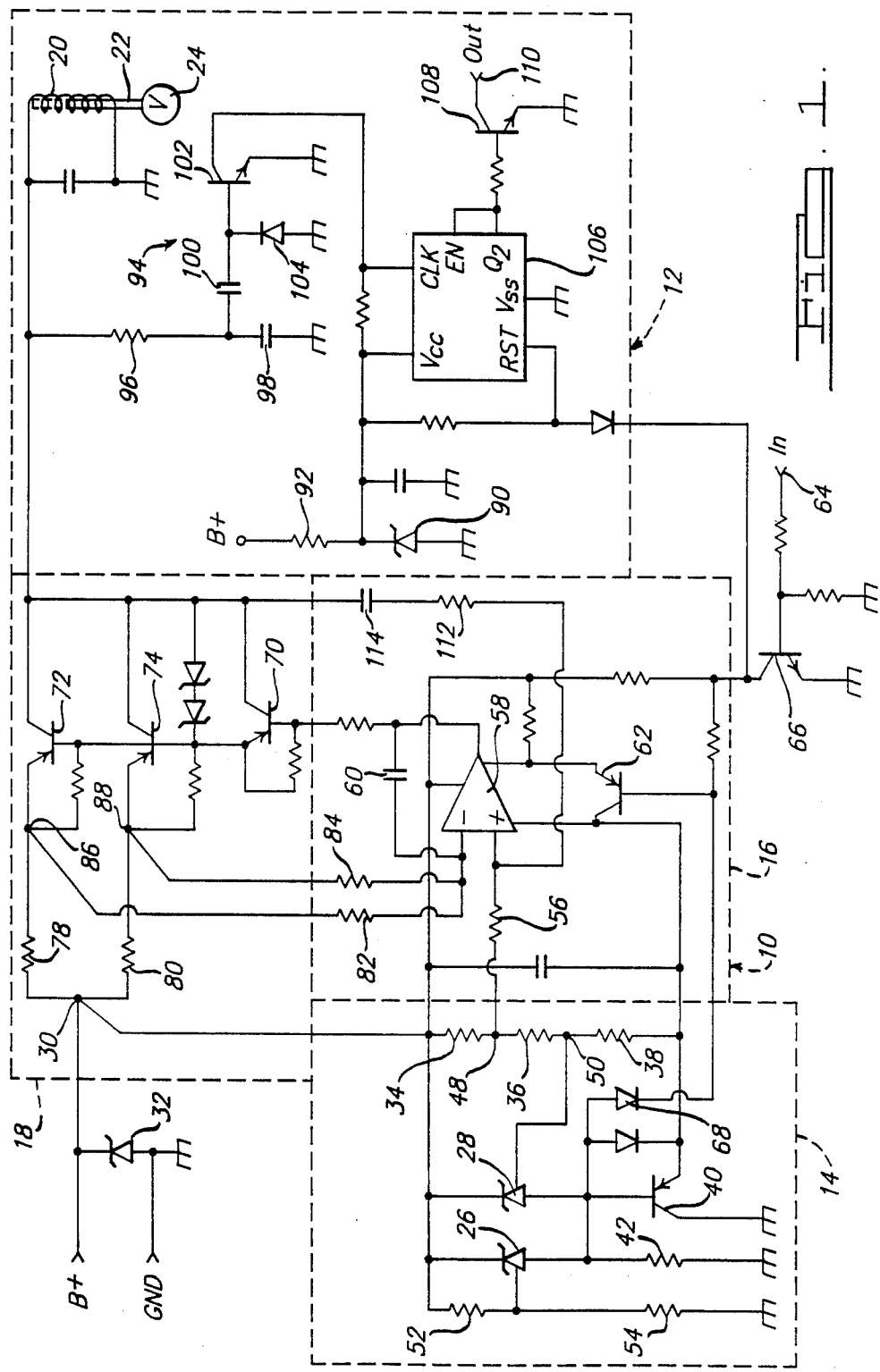

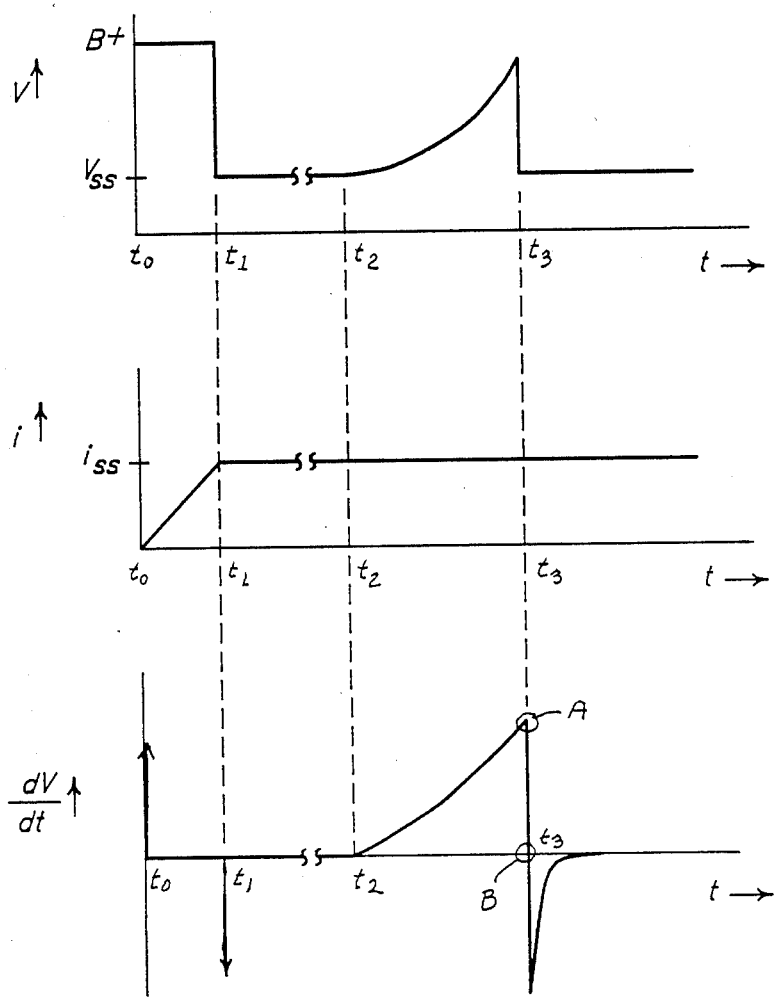
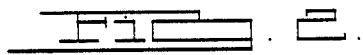

ELECTROMOTIVE SENSOR

BACKGROUND AND SUMMARY OF THE INVENTION

The present invention relates generally to event sensing and more particularly to an electronic circuit for sensing when a moving part driven by electromotive force has abruptly or discontinuously changed movement characterized by a substantially instantaneous change in velocity. The invention is thus useful for sensing when valve seating has occurred in a solenoid operated electromechanical valve.

It is often difficult to electrically determine when a moving mechanical part within a piece of machinery has reached a given location or displacement. In an electromechanical valve, for instance, the precise location of the valve is often difficult to determine, because the valve may be located in a fluid sealed system and cannot be easily outfitted with attached position sensors or contact sensors. In a fluid sealed system, it is difficult to convey signals from an attached sensor to external electronic equipment, since the signal wires or other telemetry path must cross the fluid seal boundary creating a problem with leaks.

Magnetic sensors, in which a magnet is placed on the valve and a remotely located magnetic field senses position, may work in some applications. However, magnetic sensors are not universally useful since metal valve bodies and housings can block magnetic fields, rendering such sensors ineffective. Optical sensors have similar problems.

The present invention solves the sensing problem in a simple, yet elegant manner. Rather than relying on attached sensors and remote telemetry paths, the invention monitors the waveforms of the electrical energy being supplied the electromotive device. By sensing the time rate of change in the voltage across the electromotive device a transition is detected when a discontinuity occurs in the accelleration of the moving part. This voltage time rate of change is detected and used to determine the time at which the accelleration discontinuity occurred. From this information part position or displacement may be determined. In an electromechanical valve, this information may be used to determine when valve seating occurs.

For a more complete understanding of the invention, its objects and advantages, reference may be had to the following specification and to the accompanying drawings.

BRIEF DESCRIPTION OF THE DRAWINGS

FIG. 1 is a schematic diagram illustrating a first embodiment of the electronic circuit of the invention;

FIG. 2 is a series of timing diagrams depicting voltage, current and voltage change with respect to time in a first case scenario, useful in understanding the principles of the invention;

DESCRIPTION OF THE PREFERRED EMBODIMENTS

Figure 3:
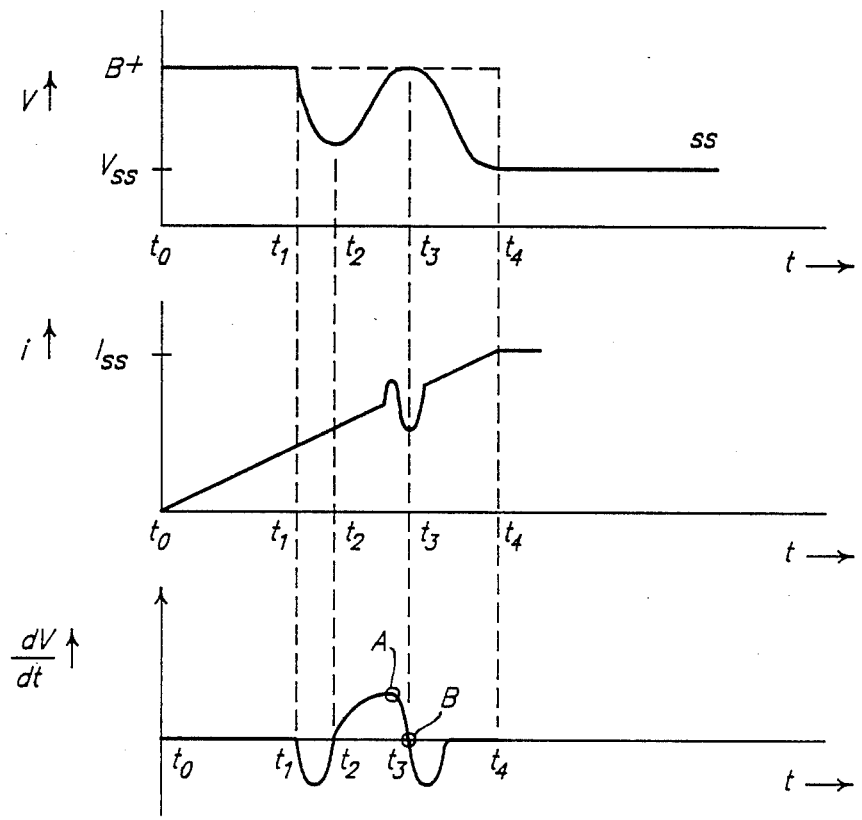
FIG. 3 is a series of timing diagrams depicting voltage, current and voltage change with respect to time in a second case scenario, useful in understanding the principles of the invention.

Referring to FIG. 1, the electronic circuit of the invention comprises a current source section 10 and a pulse detector section 12. The illustrated embodiment is suitable for automotive applications, such as detecting valve seating in a fuel injector. Portions of the circuitry are therefore designed to meet the rather stringent environmental requirements of automotive electronic circuitry. In applications which do not have such stringent requirements certain modifications and simplifications to the illustrated circuit can be made.

Referring first to the current source section 10, that section includes a power supply section 14, a transconductance amplifier section 16 and an output and output driver section 18. As will be more fully discussed, the current source section provides a substantially constant current, when called upon, for energizing the solenoid 20. Solenoid 20 produces the magnetic energy which drives the plunger 22 of valve 24 toward the seating position.

Power supply section 14 employs a pair of precision reference diodes 26 and 28 such as LM185 diodes having an adjustable cut off selected by biasing the control lead. These diodes are available from National Semiconductor. B+ is applied to the power supply section 14 via node 30. A protective zener diode 32 is coupled between B+ node 30 and ground as illustrated. The power supply section includes a precision resistor divider circuit comprising resistors 34, 36 and 38. An emitter follower circuit comprising transistor 40 and resistor 42 is connected to the anodes of precision diodes 26 and 28 with the emitter of transistor being coupled to node 46 at the base of the precision voltage divider network. The resistor values of the divider network are selected so that node 48 is maintained at 0.5 volts references to the B+ node 30. Node 50, which is connected to the control lead of precision reference diode 28, is adjustable between 1.235 volts and 6.3 volts, with the objective of maintaining node 46 regulated to 5 volts.

The power supply section employs precision reference diode 26 as a transient protection circuit. Diode 26 is biased to cut off at 1.235 volts by resistors 52 and 54. Diode 26 is biased normally off but will turn on when the B+ exceeds 30 volts. When this occurs, reference diode 26 conducts, causing the power supply circuit to be shut off. This circuit thus protects against circuit damage due to transients above 30 volts. In an automotive application, and in other applications where transients are prevalent, the use of precision reference diode 26 is preferred. In less harsh environments the precision reference diode 26 and its associated biasing circuitry may be eliminated.

The power supply section 14 supplies a reference voltage from node 48 to the transconductance amplifier section 16. More specifically, node 48 is connected through resistor 56 to the noninverting input of a low voltage operational amplifier 58. Operational amplifier 58 is preferably a Signetics SA5230 operational amplifier or the equivalent. The operational amplifier is specifically adapted for low voltage operation and has the capability of handling inputs with voltage excursions above and below the power supply rails. Resistor 56 is selected to null the quiescent current.

Operational amplifier 58 is configured as an open-loop amplifier with no direce DC feedback from output to input. Amplifier 58 is, however, provided with AC feedback via capacitor 60 so that at high frequencies the opertional amplifier is operating in closed-loop. Feedback capacitor 60 thus mades the operational amplifier circuit more stable at high frequencies.

While the operational amplifier itself is configured in open-loop, the circuit in which operational amplifier is coupled is nevertheless configured as a closed-loop circuit. Specifically, operational amplifier 58 is configured as a transconductance amplifier in which feedback is through the power transistors and current sensing resistors of the output and output driver section 28 yet to be discussed. A switching transistor 62 is coupled to operational amplifier 58 for switching the amplifier on and off. Amplifier 58 is switched off when transients cause precision reference diode to conduct and switched on when an input logic signal is applied to terminal 64 to turn on switching transistor 66. The base of transistor 62 is responsive to the collector of transistor 66 and also to the precision reference diode 26 through diode 68. Although the switching circuit including switching transistor 62 coupled to precision diode 26 is presently preferred in applications where transient protection is important, other configurations are also possible. Furthermore, if transient protection is not necessary the switching transistor 62 and its associated driver circuitry may be modified or eliminated.

The output of operational amplifier 58 is connected to a driver transistor 70 which in turn drives a pair of power transistors 72 and 74. The power transistors are connected in parallel in order to provide adequate power dissipation for driving solenoid 20. In the illustration embodiment, the circuit is designed to work at voltages up to approximately 30 volts, with solenoid 20 drawing up to 10 amps. Thus power transistors 72 and 74 must be adequate to handle approximately 300 watts, or approximately 150 watts each.

To enable power transistors 72 and 74 to share the power load approximately equally, a pair of preceision bias resistors 78 and 80 are connected betweeen the power transistor emitters and B+ node 30. Resistors may be 0.1 ohm, 1 percent 5 watt resistors, selected to increase the power transitor emitter resistance to give an approximately 0.5 volt additional drop so that both transistors will turn on at approximately the same time. Bias resistors 78 and 80 also function as the current sensing resistors which provide feedback to the inverting input of operational amplifier 58. In this regard, the inverting input of operational amplifier 58 is connected through a pair of precision resistors 82 and 84 to nodes 86 and 88, respectively. Nodes 86 and 88, when referenced to B+ node 30, indicate the average voltage drop across resistors 78 and 80, thereby indicating the current flow into power transistor 72 and 74. This power flow is, for practical purposes, equal to the power being delivered to solenoid 20.

The current source section 10, through the cooperation of power supply section 14, transconductance amplifier section 16 and the output and output driver section 18 provides a constant current source for supplying solenoid 20 with its current requirements. When the desired solenoid control logic signals are applied to input terminal 64, the current source section 10 to delivers a constant current solenoid drive signal to solenoid 20. As will be explained more fully below, the inductance of solenoid 20 changes as plunger 22 moves to operate valve 24. The solenoid voltage response to the constant current source provides an indication of valve seating. This voltage response (specifically the time rate of change in voltage) is sensed by the pulse detector section 12 next to be discussed.

The pulse detector section 12 is supplied with power from B+ through resistor 92 to which a 5.1 volt zener diode 90 is connected. Pulse detection section 12 comprises a pulse differentiator circuit illustrated generally at 94. The differentiator circuit comprises a low pass filter implemented by resistor 96 and capacitor 98 which is selected to eliminate noise without introducing excessive phase distortion. Capacitor 100 coupled to transistor 102 serves as a differentiator. Transistor 102 detects the change in slope or knee in the differential waveform just prior to the waveform zero crossing. It has been found that this knee adjacent the zero crossing is a good indicator of the value seating event. Diode 104 is coupled to the base of transistor 102 in order to clamp the differential signal to 0.7 volts. This ensures that the differentiator circuit will not saturate.

The output of transistor 102 is fed to logic gate 106, which provides a digital signal indicative of the value seating event. The digital signal is fed to driver transitor 108 which supplies the digital output signal on output terminal 110.

In order to explain the invention in operation, reference will be made to FIGS. 2 and 3 which illustrate various voltage and current waveforms under different operating conditions. FIG. 2 illustrates the voltage and current waveforms under normal operating conditions. FIG. 3 illustrates the same voltage and current waveforms under low B+ conditions in which valve seating occurs before the waveforms reach steady state. As will be explained, the invention is capable of detecting the valve seating event under both conditions.

Referring first to FIG. 2, it will be assumed that the signal has been applied to input terminal 64 at time $t_0$ and that prior to time $t_0$ the solenoid has not been energized and that the plunger is in its normal state of rest. At time $t_0$ the voltage across solenoid coil 20 is equal to the B+ voltage. At time $t_0$ the current through solenoid coil 20 is 0 and the time rate of change of the voltage (dV/dt) is a positive-going delta function or sharp spike. At time $t_0$ plunger 22 has not yet begun to move.

From time $t_0$ to time $t_1$ the solenoid coil proceeds to saturate and the current ramps up rapidly toward the steady state current $i_{ss}$, due to the high B+ voltage. The steady state current $i_{ss}$ is a constant current determined by the output of the constant current source 10.

At time $t_1$ the solenoid coil is fully saturated and further current flow in the coil provides energy tending to cause plunger 22 to begin moving. Actual movement of the plunger will commence when the electromotive forces are sufficient to overcome inertia and the forces of friction. Accordingly, at time $t_2$ the plunger 22 commences movement toward the valve seat. Referring to the waveforms, in this example, plunger movement occurs after the current has already reached steady state. Movement of plunger 22 causes the inductance of solenoid coil 20 to increase to some degree. Since the applied current is constant, the voltage across solenoid coil 20 increases after time $t_2$. Likewise, the time rate of change of the voltage also increases.

However, when plunger 22 drives the valve into its seating condition at time $t_3$ the forward movement of the plunger abruptly stops. This abrupt stop is manifested in a sharp drop in the voltage back to the steady state level $V_{ss}$ and the time rate of change in voltage abruptly changes from a positive-going waveform to a negative-going waveform, crossing the 0 axis in the process. The change from a positive-going waveform to a negative-going waveform is so abrupt that the first transition or knee at which the change from positive to negative occurs (designated A on FIG. 2) is for all practical purposes coincident in time with the 0 crossing (designated B on FIG. 2). As will be seen in discussing FIG. 3, this time coincidence is not always the case. The present invention, using transistor 102 actually triggers on the first knee, point A on the waveform. It has been found that treating point A as the time of the valve seating event gives best results, since the first knee tends to be a more stable reference point than the 0 crossing, particularly when power supply voltages drop below normal levels.

FIG. 3 depicts such a case in which power levels are below normal. At time $t_0$, when voltage is first applied to solenoid coil 20 the conditions are as they were in the example illustrated by FIG. 2. However, in this instance the B+ voltage is abnormally low such that the plunger begins to move at time $t_1$ before the current has reached steady state $i_{ss}$. The rate at which the current will ramp up to the steady state constant current level $i_{ss}$ will depend upon the magnitude of B+. Thus if B+ is abnormally low, steady state current levels may not be reached before the plunger begins moving. It is also possible that valve seating may occur before steady state current levels are reached. For example, in FIG. 3 the steady state current regime is reached at time $t_4$, which is well after both the commencement of plunger movement at time $t_2$ and the valve seating at time $t_3$. As illustrated, the time derivative waveforms of FIG. 3 are considerably more rounded than those of FIG. 2. This presents problems in determining precisely where the value seating event occurs, since the first knee at A and the 0 crossing at B are considerably displaced in time. To some extent the time displacement is due to component tolerances which are inherent in real world (nonideal) electronic components. It has been determined that the more reliable point is the knee at A, since the 0 crossing point at B becomes further and further displaced as B+ voltage levels are diminished. Thus the presently preferred embodiment of the invention is configured to detect the knee at point A. Not only is the circuit for sensing point A more accurate and reliable over all voltage ranges, it may also be implemented using a relatively inexpensive transistor such as transistor 102.

To further enhance the reliability of the circuit it has been found that a certain degree of waveshaping can be introduced by the inclusion of a mild filtration network comprising resistor 112 and capacitor 114 (FIG. 3). These components tend to slightly round the waveforms, making the response of FIG. 2 more rounded like that of FIG. 3. By this technique the overall performance of the circuit is made to be more standard and less sensitive to changes in B+ voltage, with the result of a more reliable circuit.

It should be emphasized again that the present invention is suitable for sensing valve seating or other abrupt motion change in any electromagnetic coil or solenoid-driven device. The illustrated embodiment is particularly suited for use in sensing valve seating in a fuel injector system for automotive vehicles. Thus the illustrated embodiment has certain circuit features and provisions to allow the invention to operate in the harsh environment found in automotive vehicles. Specifically, the illustrated embodiment has been designed to operate over a wide voltage range from 5 volts to just under 30 volts and to operate at temperatures up to 125° C. Naturally, if a particular application will not encompass such a harsh environment, the circuit can be simplified from the illustration embodiment and such simplification is not to be construed as being outside the scope of the invention as set forth in the appended claims.

Figure 4A:
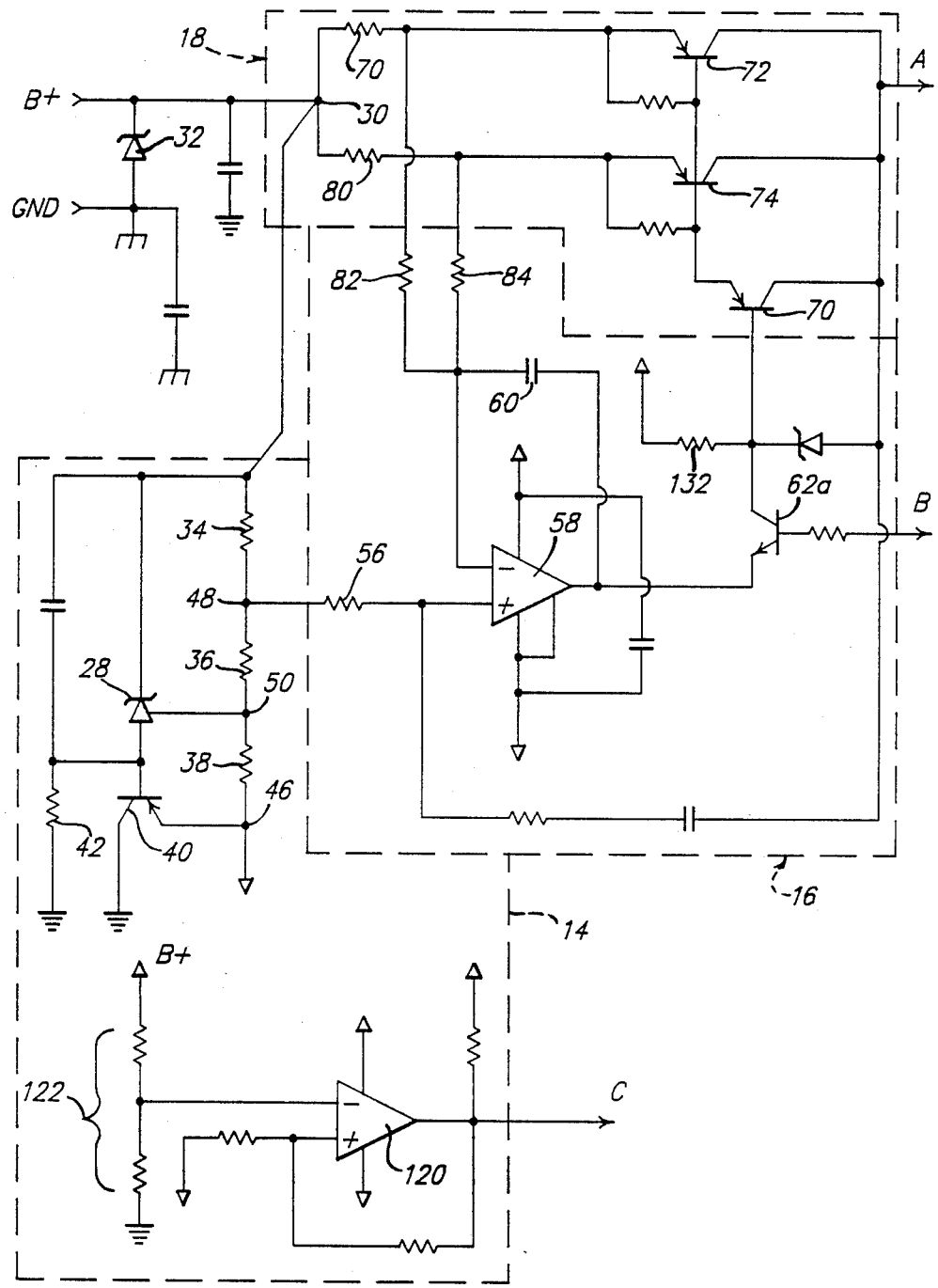
FIGS. 4a and 4b are a schematic diagram illustrating a second preferred embodiment of the electronic circuit of the invention.
Figure 4B:
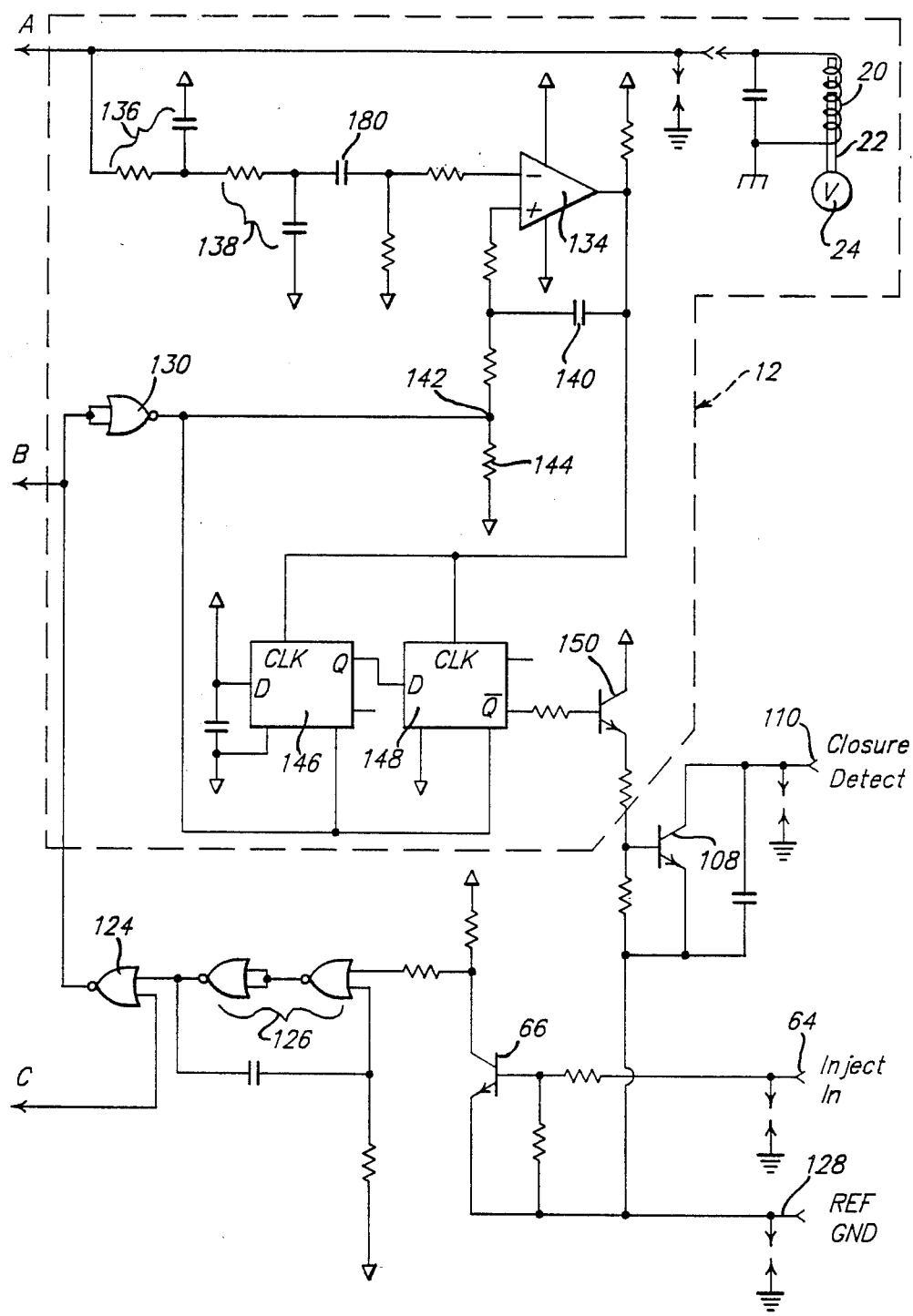

Referring now to FIGS. 4a and 4b, a second presently preferred embodiment of the invention is illustrated. The illustrated embodiment of FIGS. 4a and 4b is similar in many respects to the embodiment of FIG. 1. Accordingly, where applicable, like reference numerals have been assigned to components which serve a similar purpose in both embodiments. Since the embodiment of FIG. 1 has been described in detail, the following will focus primarily on the differences between the two embodiments.

The power supply section 14 is somewhat different than the embodiment of FIG. 1, primarily in that precision reference diode 26 has been eliminated and replaced with a comparator circuit 120. The positive input of comparator circuit 120 is coupled to the 4.75 volt (nominally 5 volt) supply voltage, which may be derived from node 46. The negative input is derived from voltage divider network attached to the battery line. Comparator 120 senses when the battery voltage drops below a predetermined level, causing the circuit to shut down by supplying a signal to logic gate 124 yet to be discussed. Doides 68 of the FIG. 1 embodiment have also been eliminated from the power supply circuit of the FIG. 4 embodiment. These diodes serve as catch diodes in the earlier described embodiment, receiving excess current flow from the switching transistor 66. In the embodiment of FIG. 4, a different technique for switching operational amplifier 58 on and off is adopted, thus making it possible to eliminate the need for diodes 68.

In the embodiment of FIG. 4, transistor 66 is responsive to the injection in signal at terminal 64 and provides an output through one shot gates 126. These one shot gates are used principally as protection against voltage drop fluctuations in the ground, which may be present when solenoid 20 is de-energized. It is not uncommon for solenoid 20 to draw approximately 10 amperes in use. When the solenoid is first energized, the current through the solenoid coil rises slowly. However, when the solenoid id de-energized, a very rapid current drop is experienced, leading to fluctuations in the chassis ground. To overcome this, the circuit provides a separate reference ground at 128 which is not affected by the switching of solenoid 20. However, in case a reference ground is not available, one shot gates 126 are provided.

The output of one shot gates 126 is fed to logic gate 124 which also receives an input from comparator circuit 120. Gate 124 is a NOR gate which essentially adds the inputs from comparator circuit 120 and from one shot gates 126, so that either input source will trigger the circuit.

The output of logic gate 124 is applied to transistor 62a (FIG. 4a) and also to an invertor gate 130. The output of invertor gate 130 is used to switch the pulse detector circuit on and off. Transistor 62a is used to shut down the operational amplifier 58. Thus in comparing the embodiment of FIG. 4 with that of FIG. 1, it will be seen that another difference is in the manner in which operational amplifier 58 is shut down. Rather than switching operational amplifier 58 off by adjusting its bias level, as in the embodiment of FIG. 1, the embodiment of FIG. 4 uses transistor 62a to switch the output of operational amplifier 58 on and off. In many applications, the approach taken in the embodiment of FIG. 4 results in a faster acting circuit. The collector of transistor 62a thus supplies the drive circuit to transistor 70. Since transistor 62a is configured to pull down the level on the base of transistor 70, a pull up resistor 132 is provided. One reason that this embodiment is fast acting is that the opertional amplifer 58 is running at all times. When transistor 62a pulls the base of transistor 70 low, the circuit switches off. However, because operational amplifer 58 is not switched off, it will sense the negligible current flow at its output and increase gain in an effort to maintain the current constant. When transistor 62a is switched back on, operational amplifier 58 is in a high gain state with the ability to deliver a very fast rise time current.

The pulse detector circuit 12 of the embodiment of FIG. 4 is different in that it employs a CMOS comparator 134 in place of the transistor 102 of the FIG. 1 embodiment. By virtue of the manner in which this alternate embodiment is constructed, the additional power supply comprising resistor 92 and zener diode 90 of the embodiment of FIG. 1 has also been eliminated. The pulse detector circuit of FIG. 4 is capable of being driven from the same power supply circuit 14 as the remaining portions of the circuit.

Pulse detector circuit 12 of the FIG. 4 embodiment employs two low pass filters 136 and 138 which drive the differentiator capacitor 100 which in turn drives the comparator 134. Comparator 134 includes an AC feedback capacitor 140 which provides positive feedback hysteresis. It was found that DC feedback is not necessary in this application and can cause problems with low voltage sensitivity. The output of inverter 130 is coupled to gate 142 of the comparator circuit. Node 142 is driven to ground when the comparator is switched on. Pull down resistor 144 is provided to assist the CMOS gate in going to ground, if required. Since the circuit must sense low voltage waveforms, even down to a few hundred millivolts, it is important that the comparator circuit be capable of referencing fully down to ground.

In place of the logic gate 106 of the FIG. 1 embodiment, the FIG. 4 embodiment utilizes two flip-flop circuits 146 and 148. These gates provide essentially the same function as gate 106 of the FIG. 1 embodiment. The output of flip-flops 146 and 148 is provided to a level shifting transistor 150 which is positive referenced and provides the necessary translation to the negative referenced transistor 108. It will be seen that the emitter of transistor 108 is coupled to the reference ground 128.

In operation, the circuit of FIG. 4 operates essentially the same as was described for the embodiment of FIG. 1 and as illustrated in the timing diagrams of FIGS. 2 and 3.

Furthermore, while the presently preferred embodiment for a typical application has been illustrated, it will be understood that the invention is capable of a certain degree of modification without departing from the spirit of the invention as set forth in the appended claims.

What is claimed is:

1. A circuit for sensing abrupt change in movement of an electromotively-driven part in an electrically-powered device, comprising:

a constant current source for supplying a substantially constant current to said device;

a means for monitoring a property indicative of the voltage across said device and for providing a corresponding voltage signal;

differentiator means receptive of said voltage signal for determining the time rate of change of said voltage signal;

detector means coupled to said differentiator for detecting change in the algebric sign of said time rate of change of said voltage signal, said algebraic sign being indicative of abrupt change in movement of said electromotively-driven part.

2. A circuit for sensing the onset of valve seating in an electromagnetically-operated valve of the type having an energizing coil and a moving valve body, comprising:

a power supply means for delivering a substantially constant current to said coil; and a pulse detector means coupled to said coil for sensing the time rate of change in voltage at said coil, said time rate of change in voltage being at least in part responsive to the movement of said valve body;

said pulse detector means detecting the occurence of a change in algebraic sign of the derivative of said time rate of change in voltage, said change in algebraic sign being indicative of the onset of valve seating.

* * * * *